UNITED STATES PATENT OFFICE.

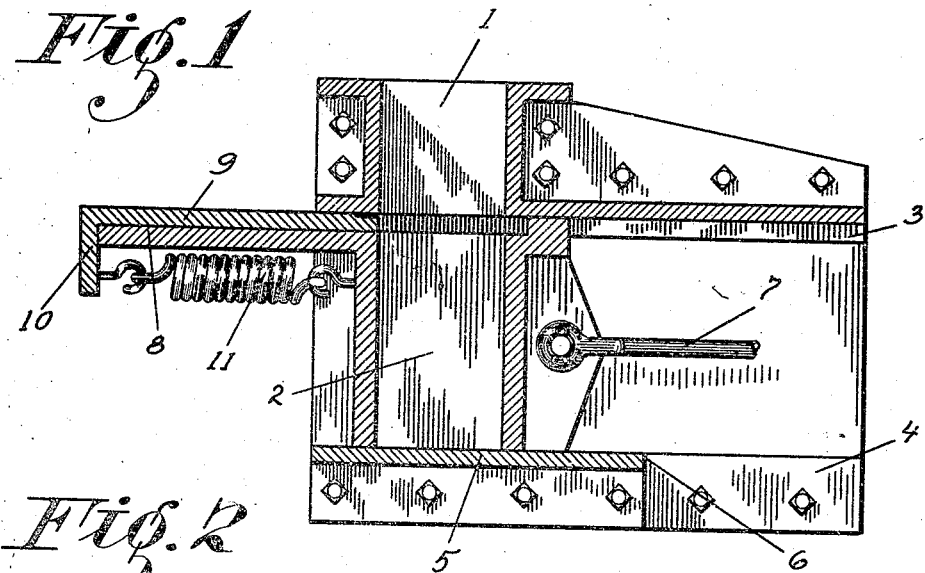
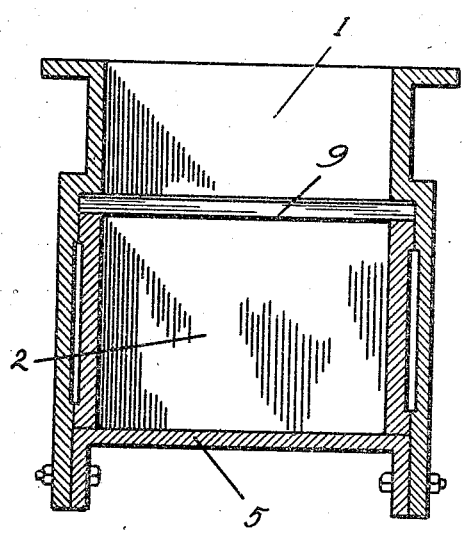
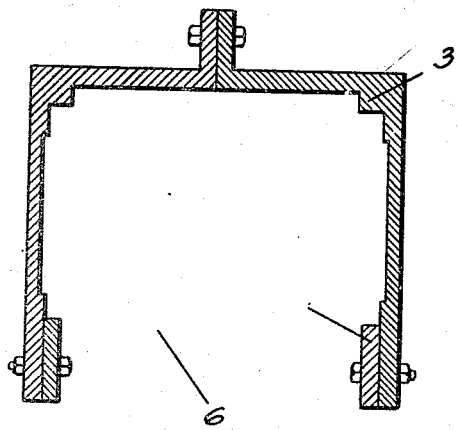

HARRY McCAIG AND WILFRED CURTIS STEVENSON, OF CEMENT, CALIFORNIA.

VOLUMETRIC FEED-GATE.

1,295,540.　　　　Specification of Letters Patent.　　Patented Feb. 25, 1919.

Application filed April 9, 1917. Serial No. 160,779.

*To all whom it may concern:*

Be it known that we, HARRY McCAIG and WILFRED CURTIS STEVENSON, citizens of the United States, residing at Cement, in the county of Solano, State of California, have invented certain new and useful Improvements in Volumetric Feed-Gates; and we do declare the following to be a full, clear, and exact description of the same, reference being had to the accompanying drawings, and to the characters of reference marked thereon, which form a part of this application.

This invention relates to improvements in measuring apparatus and particularly to a volumeter for measuring material from one container to another. The meter is so constructed as to measure and deliver from the first container to the second a positive quantity of material each time the same is operated. In addition to this feature, the object of the invention is to provide a gate for the inlet from the first container which under normal conditions will travel with the meter and close the inlet opening, but which, if hard or foreign substances lodge between the inlet opening and the measuring receptacle, will engage and hold the same and at the same time allow the measuring receptacle to continue its movement uninterruptedly. When the measuring receptacle has been emptied and is returned to normal position in register with the inlet it engages and opens the said gate. Thereupon the foreign material drops into the measuring receptacle.

A further object of the invention is to produce a simple and inexpensive device and yet one which will be exceedingly effective for the purposes for which it is designed.

These objects we accomplish by means of such structure and relative arrangement of parts as will fully appear by a perusal of the following specification and claims.

In the drawings similar characters of reference indicate corresponding parts in the several views.

Figure 1 is a vertical longitudinal section of the entire device.

Fig. 2 is a vertical transverse section through the inlet and measuring receptacle.

Fig. 3 is a similar vertical section through the discharge end of the device.

Referring now more particularly to the characters of reference on the drawings the numeral 1 designates the inlet from the bin, hopper or other container into the measuring receptacle 2. This measuring receptacle is arranged for longitudinal movement through the guides 3 and on runners 4. When the measuring receptacle 2 is in register with the inlet 1 it is mounted on a floor 5 which prevents any material from dropping out of the receptacle 2. This floor 5 however, terminates short of the ends of the runners 4 so as to provide an opening 6. Movement is imparted to the measuring receptacle 2 by means of a rod 7 which may be connected with any suitable source of power. The device is used for measuring dry fine material of any sort. The same drops from the supply bin, hopper or container through the inlet 1 and into the measuring receptacle 2 which is of a predetermined and positive size. When the receptacle 2 is full it is moved by means of the rod 7 along the runners 4 until the opened lower end of such receptacle 2 moves out of engagement with the floor 5 and into register with the opening 6 whereupon the material in such receptacle 2 drops into any other desired receiving container. Thereupon the receptacle 2 is returned to normal position and into register with the inlet 1.

While the receptacle 2 is being moved to its discharge opening 6 it is necessary of course, to shut off the inlet 1. In view of the fact that hard particles of greater size than the material being measured oftentimes lodges between the inlet 1 and the receptacle 2 and prevents the operation of the said receptacle 2 we have found it very advantageous to provide a means for overcoming this difficulty and this we have done by means of our improved gate which is constructed and operated as follows, namely:

On the upper end of the receptacle 2 is an outwardly projecting plate 8. Mounted in sliding relation on this plate 8 is a flat gate 9 having a downwardly projecting flange 10 at its outer end. This flange 10 is normally held in engagement with the outer end of the plate 8 by means of a spring 11 interposed between the receptacle 2 and such flange 10. Under all normal conditions therefore the gate 9 travels with the receptacle 2 and completely closes the inlet 1 as the receptacle 2 moves out of register therewith. In the event, however, that a particle of foreign material should lodge between the inlet 1 and the receptacle 2 this gate 9 would engage the same and clamp it between the side of the inlet 1 and the edge of the gate. Then with continued movement of the receptacle 2, the gate 9 would remain stationary. The spring 11 would distend and the plate 8 would slide underneath the gate 9 thus allowing the receptacle to be moved to its discharging position irrespective of the obstruction. Then when the receptacle was moved back to register with the inlet 1 the flange 10 would pull the gate 9 back to normal position and it would then be carried open by the engagement of the plate 8 with the flange 10.

From the foregoing description it will be readily seen that we have provided a simple and effective volumeter for dry material and one which can not be blocked by particles of larger size than the material itself. The larger particles will be held by the independent gate and then when the measuring receptacle is again brought into register with the inlet they will drop down freely into the same. We are not aware that prior to our invention any volumetric feed gate has been made which would not be stopped by such large, hard foreign particles.

From the foregoing description it will be readily seen that we have produced such a device as substantially fulfils the object of the invention as set forth herein.

While this specification sets forth in detail the present and preferred construction of the device, still in practice such deviations from such detail may be resorted to as do not form a departure from the spirit of the invention as defined by the appended claims.

Having thus described our invention what we claim as new and useful and desire to secure by Letters Patent is:

1. A volumeter comprising a frame having an inlet and an outlet, a measuring receptacle mounted for sliding movement whereby it may be brought into separate register with the inlet and outlet, a gate slidable with the receptacle to close the inlet as the receptacle moves out of register therewith and means whereby, when the gate encounters an obstacle, the receptacle may continue to move independently thereof.

2. A volumeter comprising a frame having an inlet and an outlet, a measuring receptacle mounted for sliding movement whereby it may be brought into separate register with the inlet and outlet, a gate slidable with the receptacle to close the inlet as the receptacle moves out of register therewith and means whereby, when the gate encounters an obstacle, the receptacle may continue to move independently thereof, such means including a spring connection between the receptacle and the gate adapted to be overcome by the pressure of the obstacle against the gate.

3. A volumeter comprising a frame, having an inlet and an outlet, a measuring receptacle mounted for sliding movement whereby it may be brought into separate register with the inlet and outlet, a projecting plate on the receptacle, a gate mounted on the plate and adapted to form a closure for the inlet as the receptacle moves out of register therewith, a flange on the gate held normally against the plate to cause the gate to move with the receptacle but arranged to allow the receptacle to move independently of the gate when the latter encounters an obstacle in its path.

In testimony whereof, we affix our signatures in presence of two witnesses.

HARRY McCAIG.
WILFRED CURTIS STEVENSON.

Witnesses:
PERCY S. WEBSTER,
KATHERINE McANDREWS.